June 11, 1957 — R. S. DAVIDSON — 2,795,097
COTTON PICKER
Filed Nov. 23, 1955 — 4 Sheets-Sheet 3

INVENTOR.
Ruby S. Davidson
BY Victor J. Evans & Co.
ATTORNEYS

June 11, 1957  R. S. DAVIDSON  2,795,097
COTTON PICKER
Filed Nov. 23, 1955  4 Sheets-Sheet 4
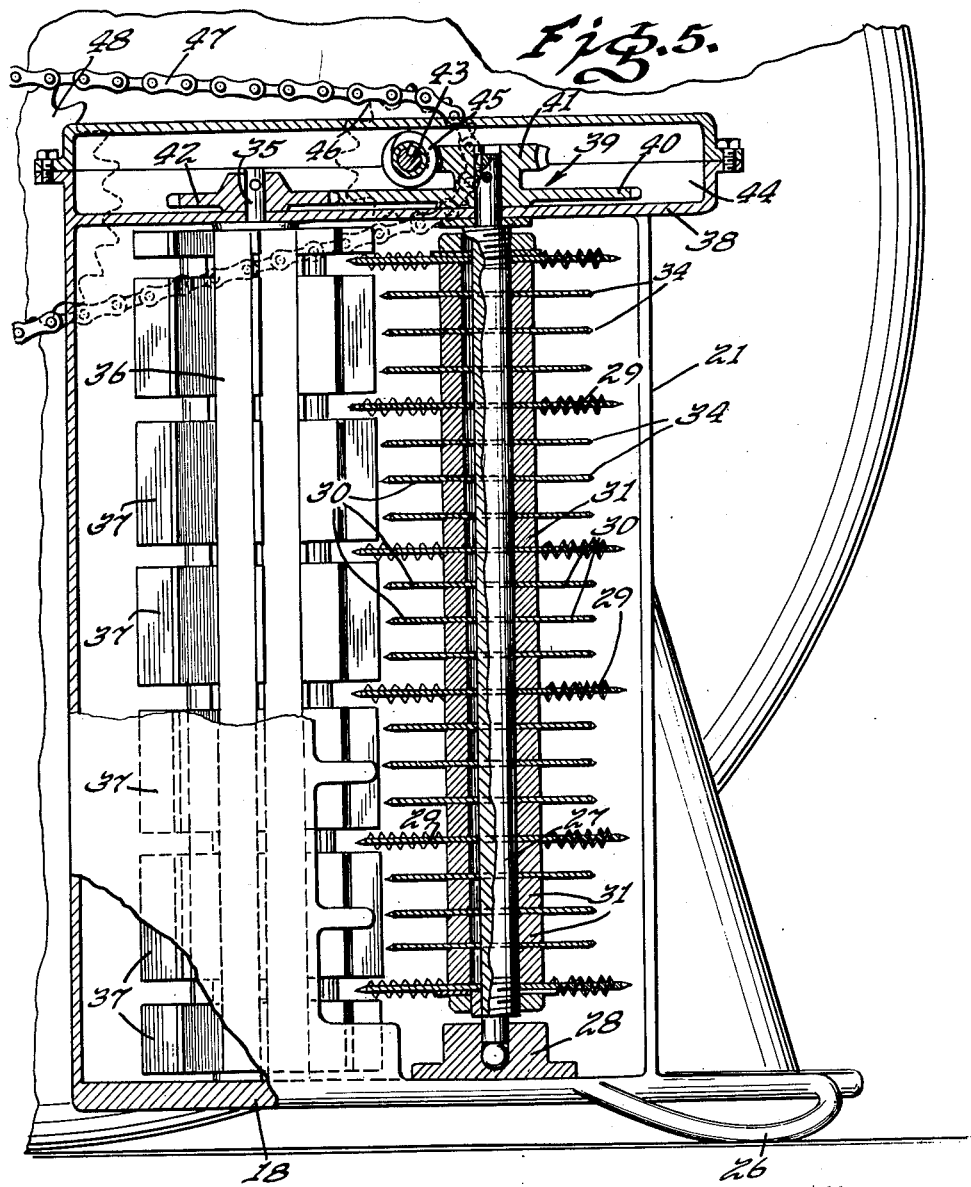
INVENTOR.
Ruby S. Davidson
BY 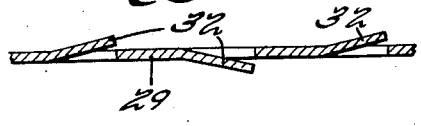
ATTORNEYS

United States Patent Office 2,795,097
Patented June 11, 1957

2,795,097

COTTON PICKER

Ruby S. Davidson, Covington, Tenn., assignor of one-half to Charles P. Noell, Covington, Tenn.

Application November 23, 1955, Serial No. 548,657

5 Claims. (Cl. 56—48)

This invention relates to agricultural equipment, and more particularly to a cotton picker.

The object of the invention is to provide a cotton picker which may be mounted on a tractor so that cotton can be readily and automatically picked as the tractor moves through the field of growing cotton.

Another object of the invention is to provide a cotton picker for mounting on a tractor whereby one or two rows of cotton can be simultaneously and automatically picked as the tractor moves through the field, the cotton picker of the present invention including a plurality of rotating discs or blades which have teeth thereon whereby the cotton burrs are readily removed from the cotton plants and then these cotton burrs are removed from the discs or blades and carried upwardly by means of a suction creating member so that the cotton can be deposited in a suitable hopper from which it can be emptied or discharged when desired.

A further object of the invention is to provide a cotton picker which is extremely simple and inexpensive to manufacture.

Other objects and advantages will be apparent during the course of the following description.

In the accompanying drawings, forming a part of this application, and in which like numerals are used to designate like parts throughout the same, Figure 1 is a front elevational view of the cotton picker mounted on a tractor, with parts broken away and in section.

Figure 5 is a sectional view taken on the line 5—5 of Figure 3.

Figure 6 is an enlarged sectional view taken on the line 6—6 of Figure 3.

Figure 7 is an enlarged sectional view taken on the line 7—7 of Figure 3.

Figure 1:
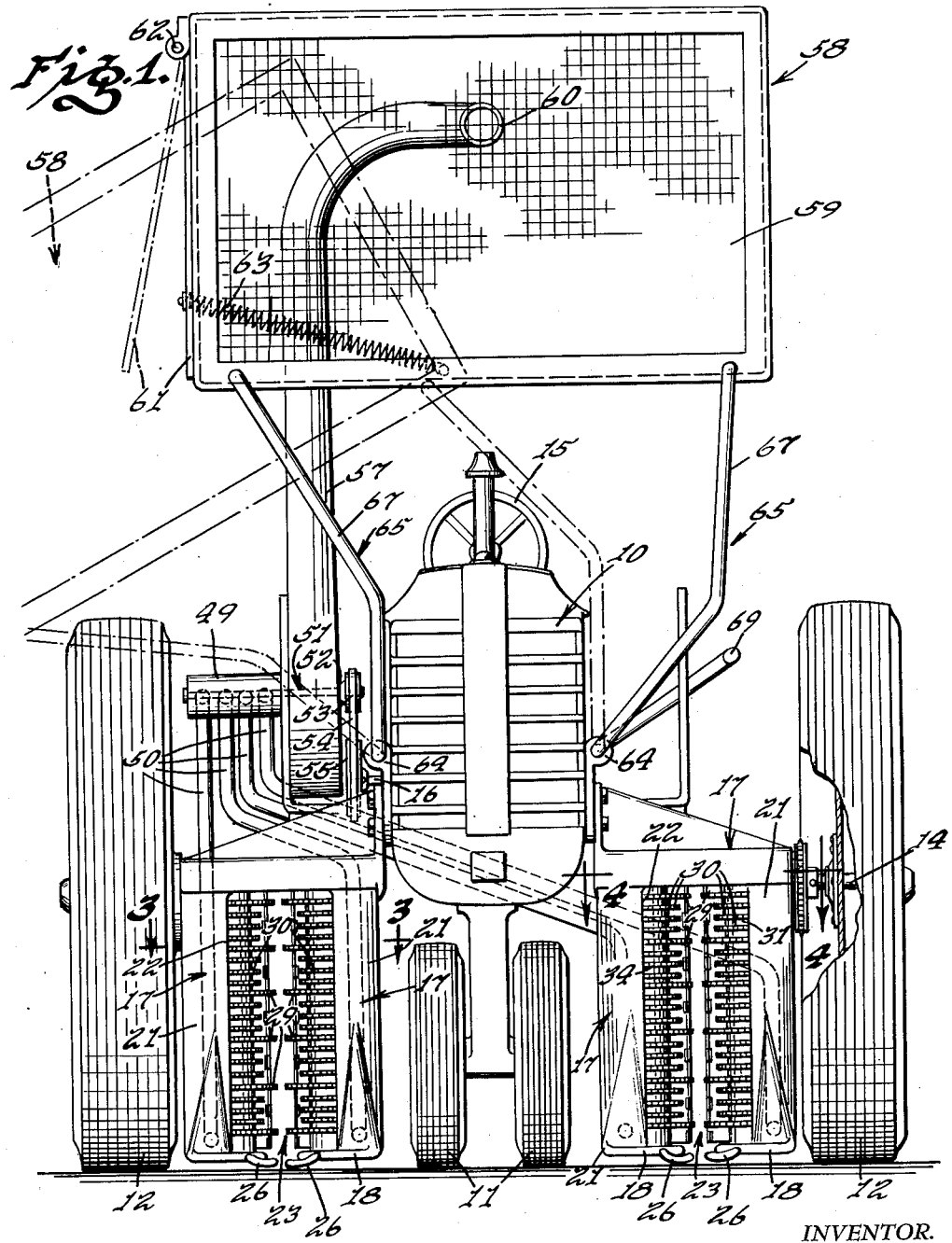

Referring in detail to the drawings, the numeral 10 designates a conventional tractor which includes the usual front wheels 11 and rear wheels 12 which may be mounted on a rear axle 14. The tractor 10 further includes a steering wheel 15 and a power take-off shaft 16, Figure 2.

Mounted on each side of the tractor 10 is a pair of hollow housings 17 which each have similar construction, and the housing 17 can be made of any suitable material such as metal. Each housing 17 includes a horizontally disposed bottom wall 18, a rear wall 19, and a side wall 20 which may terminate in a front wall portion 21, Figure 3. Portions of each of the housings 17 are cut-away or cutout as at 22 for a purpose to be later described. The housings 17 are arranged in pairs and are spaced slightly apart so as to define a space 23 whereby growing plants such as the cotton plants 24, Figure 2, may be received in the space 23 between the housings. The cotton plants 24 may have the plurality of cotton burrs 25 thereon. Arranged at the front portion of each of the housings 17 is a guide member 26, and the guide members 26 are adapted to engage the cotton plants 24 so as to help straighten these plants and guide them into the space 23 between the housings.

Rotatably mounted in each of the housings 17 is a first shaft 27 which may have its lower end engaging a bearing assembly 28, Figure 5. A plurality of horizontally disposed spaced parallel discs 29 are mounted on the shaft 27, and there is further provided a second set of spaced parallel discs 30 which are also mounted on the shaft 27. The discs 30 are of smaller diameter than the discs 29, and spacer members 31 are interposed or positioned between these various discs.

Figures 3, 4:
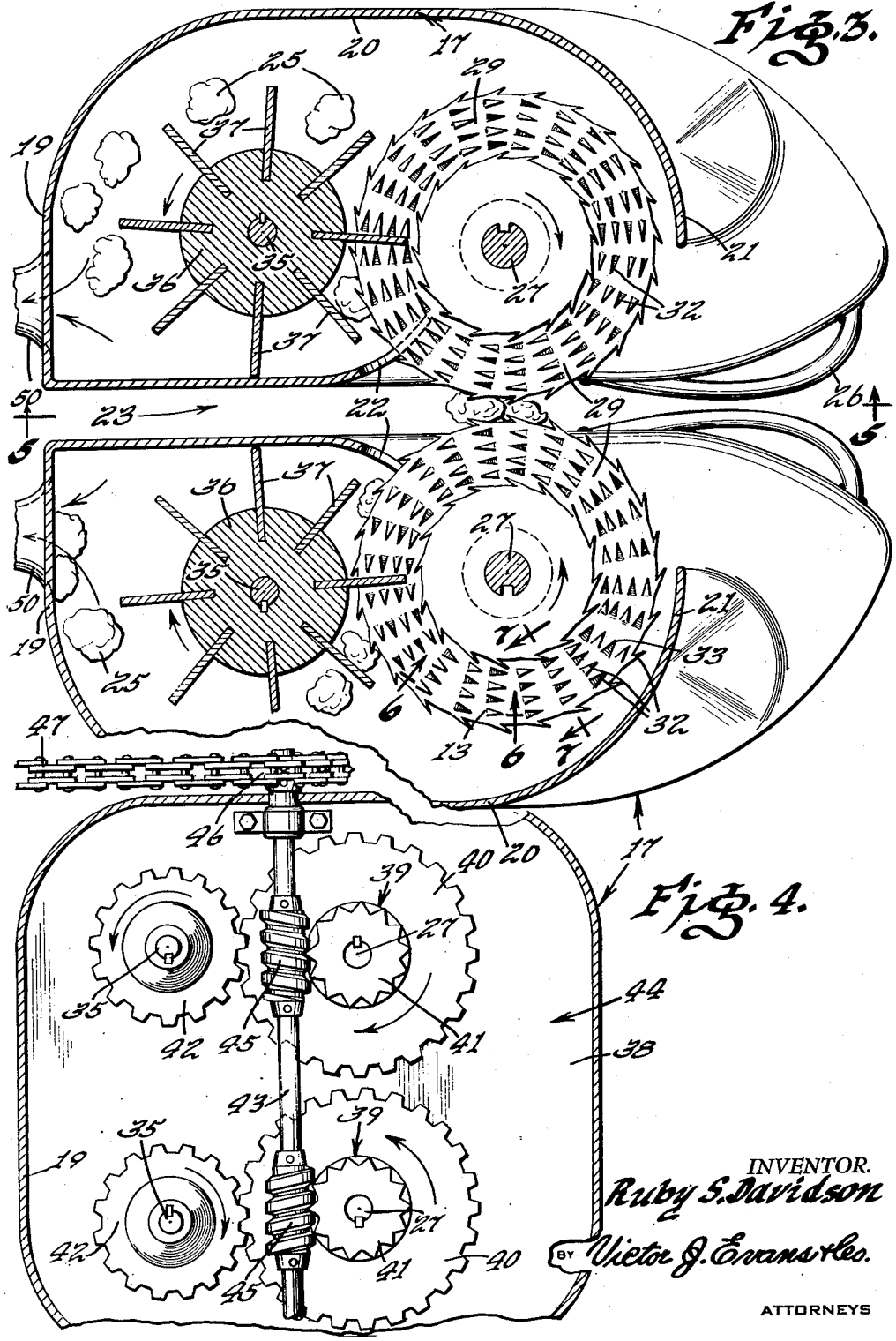
Figure 3 is an enlarged scetional view taken on the line 3—3 of Figure 1.
Figure 4 is an enlarged sectional view taken on the line 4—4 of Figure 1.

Each of the discs 29 is provided with a plurality of teeth 32 and 33, Figures 6 and 7, and these teeth serve to grip the cotton 25 so that the cotton will be removed from the plants. The smaller discs 30 are also provided with teeth 34. Due to the provision of the discs 30 and 29 of different sizes, the cotton picker of the present invention will gather in all of the cotton and harvest it regardless of the position or size of the cotton. It will be seen from Figures 1 and 3 of the drawings that the discs in one of the housings 17 coact with the discs in the other housings 17 so that cotton therebetween will be harvested or picked. Portions of the discs may project through the cutout 22, as shown in Figure 3, and as shown in Figure 1.

Arranged in spaced parallel relation with respect to each of the first shafts 27, is a second shaft 35, and the shaft 35 is positioned rotatably in the housing 17. A support member 36 may be mounted on each shaft 35, and a plurality of radially extending blades 37 extend outwardly from each of the support members 36. The blades 37 are spaced apart slightly as shown in Figure 5 so that the larger discs 29 may have sufficient clearance therebetween, and the blades 37 serve to cooperate with and remove the cotton from the discs whereby this cotton can be passed to a suitable receptacle as later described in this application. Due to the provision of a predetermined size of gearing, the blades 37 rotate faster than the discs 30 and 29 so that the cotton will be readily stripped or removed from the discs.

Mounted on the upper end of the shaft 27 is a gear member 39 which includes a first gear wheel 40 and a second gear wheel 41, and the gear wheels 40 and 41 may be formed integral with each other or may be secured together. A third gear or pinion 42 is mounted on the upper end of the shaft 35, and the pinion 42 meshes with the second gear wheel 40. A drive shaft 43 extends into a casing 44, and the casing 44 may hold a suitable quantity of lubricant such as oil. The casing 44 may be defined in the top of the housing by means of a horizontal partition 38, Figure 5.

Extending into each of the casings 44 is a drive shaft 43 and each drive shaft 43 has a pair of worm gears 45 mounted thereon. The worm gears 45 mesh with the second gear wheels 41. As shown in Figure 4, there may be provided one casing 44 for each pair of housings 17 so that there is provided a rigid connection between the tops of each pair of housings.

Mounted on the outer end of each drive shaft 43 is a sprocket 46 which has an endless chain 47 trained thereover, and the chains 47 are trained over sprockets 48 which are mounted on the rear axle 14. It will be noted that the pinions 42 are of smaller diameter than the gear wheels 40 so that the shaft 35 will rotate faster than the corresponding or opposite shaft 27 whereby the blades 37 will readily strip the cotton from the discs.

Figure 2:
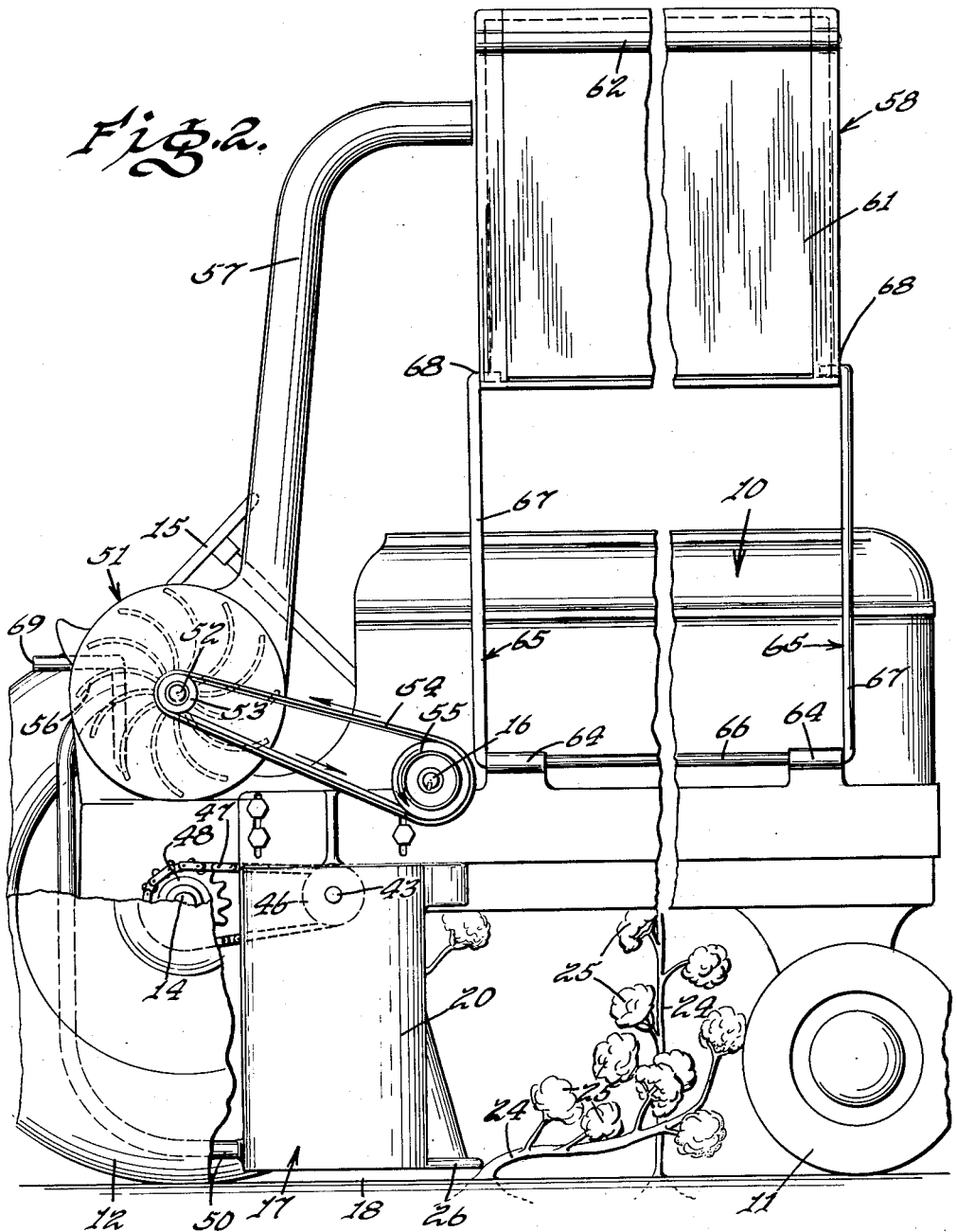
Figure 2 is a side elevational view showing the cotton picker of the present invention, with parts broken away and in section.

Mounted at the rear of the tractor on a suitable support is a suction creating fan which is indicated generally by the numeral 51, Figure 2. A hollow body member 49 has a plurality of conduits 50 leading therefrom, and the conduits 50 extend to the bottom of the housings 17. The conduits 50 are adapted to have passed therethrough the cotton which is removed from the discs by means of the blades 37. This cotton thus passes up through the conduits 50 and enters the body member 49. The fan 51 may include a shaft 52 which has a pulley 53 mounted thereon, and an endless belt 54 is trained over the pulley 53. The belt 54 is also trained over a pulley 55 which is mounted on the power take-off shaft 16. The fan 51 may include the plurality of vanes or blades 56 which extend outwardly from the shaft 52.

Extending upwardly from the fan 51 is a conduit 57 which is adapted to discharge the cotton into a hopper or receptacle 58 which is mounted above the tractor. The hopper 58 may include reticulated side walls 59 which may be made of any suitable material such as wire mesh screen material. The hopper 58 is further provided with an opening 60 which is adapted to selectively register with the open end of the conduit 57 so that the cotton can be readily blown through the opening 60 into the hopper 58. There is further provided on the hopper 58 a door 61 which is hingedly connected to the hopper by means of a hinged construction 62, Figure 1, so that by opening the door 61 the cotton can be discharged or removed from the hopper. A coil spring 63 serves to maintain the door 61 normally in its closed position.

A means is provided for pivotally mounting the entire hopper 58 so that for example the hopper 58 can be moved from the solid line position in Figure 1 to the broken line position of Figure 1 as when the hopper is to be emptied of cotton. This mounting comprises rods 65 which have lower horizontal portions 66 pivotally mounted in bearing members 64 that may be secured to the sides of the tractor. The rod 65 further include vertical portions 67 which terminate in transverse fingers 68 that pivotally engage the bottom of the hopper.

As seen in the drawings, the discs 29 are provided with a plurality of teeth 32 which may extend in opposite directions. However the top and bottom discs may be free of any teeth except on its outer periphery. The manually operable crank 69 can be moved to cause tilting or pivotal movement of the hopper 58. Thus, the crank 69 can be manually gripped to swing the hopper 58. The crank 69 may be secured as by welding, to one of the rods 65.

From the foregoing, it is apparent that there has been provided a cotton picker which is adapted to be mounted on a tractor such as the tractor 10. In use with the parts arranged as shown in the drawings, the tractor 10 is adapted to be driven along a field of growing cotton plants such as the plants 24. These plants with the cotton 25 thereon pass or are received in the space 23 between each pair of cooperating housings 17. At the same time, the discs 29 are rotating so that the teeth 32 engage the cotton 25 to remove it from the plants 24. The discs 30 are smaller than the discs 29 so that the cotton will be harvested regardless of its size. The discs 29 and 30 are rotated by means of the shaft 27. The rotation of the shaft 27 is effected by means of the shaft 43 which has the worms 45 meshing with the gear wheel 41. The shaft 43 is rotated by means of the chain 47 which can be driven by the rear axle 14 of the tractor. At the same time that the discs 29 and 30 are rotating, the blades 37 are also rotating at a faster rate than the discs so that the cotton will be stripped from the discs and deposited in the bottom of the housing. This cotton will then be sucked up through the conduit 50 due to the suction created by the fan 51, and the fan 51 is operated by the belt 54 and power take-off shaft 16. The cotton then leaves the fan 51 and passes up through the stationary conduit 57 and this cotton is discharged through the opening 60 and into the hopper 58. When it is desired to empty the hopper 58, it is only necessary to grip and rotate the crank 69 and this causes rotation of the hopper 58, so that the hopper 58 can move from the solid line position of Figure 1 to the broken line position of Figure 1. Then, the door 61 can be opened so that the cotton can be removed therefrom. The blades 37 are rotated by means of the gear 42 which meshes with the gear 40, the gear 42 being connected to the upper end of the shaft 35. A spring 63 maintains the door 61 normally in its closed position. Due to the position of the space 23 between the housing 17, the plants 24 will not be injured as the cotton is stripped or harvested therefrom. The guide members 26 help to align or guide the cotton plants into the path of the stripping discs. It is to be understood that while the drawings illustrate a two row cotton picker, that the device can be constructed for use in only one row of cotton.

The teeth on the discs are shaped so that the cotton will be pulled from the plants without damaging the cotton.

If desired the unit can be pulled by a tractor or it can be arranged to operate from the power take-off shaft. The discs or saws move just fast enough to clean the lint cotton off of the stalks and the brushes or blades 37 move faster than the disc in order to pull the cotton from the teeth. The picker can be pulled by the tractor or by means of any other suitable vehicle. Since certain walls such as the walls 59 of the hopper 58 are made of wire screen, so dust can leave the hopper and the cotton will be retained therein. The opening 60 in the hopper 58 registers with the open end of the conduit 57 when the hopper 58 is in its raised or normal position.

The picking unit can be thrown in and out of gear and can be moved up and down if preferred and can be adjusted to the row.

I claim:

1. In a cotton picker, hollow housings arranged in pairs in spaced apart relation with respect to each other, a first and second vertically disposed shaft rotatably mounted in each of said housings, said housings being spaced apart slightly to permit passage therebetween of cotton plants, said housing being provided with opposed cut outs, a first set of spaced parallel horizontally disposed superimposed discs positioned in said housings and mounted on said first shaft, portions of said first discs projecting through said cut outs, a second set of spaced parallel horizontally disposed discs mounted on said first shaft, said discs being provided with a plurality of teeth thereon, gear means interconnecting said first and second shafts together, power means for driving said shafts, a plurality of radially extending blades mounted on said second shaft for cooperation with said discs to remove cotton from said discs, a suction fan spaced from said housings, conduit means connecting said fan to said housings, a hopper spaced from said fan, and conduit means connecting said hopper to said fan, said second discs being smaller than said first discs, guide members extending forwardly from said housings, manually operable means for tilting said hopper, said hopper being provided with a spring pressed door, and said hopper including reticulated walls.

2. In a cotton picker, in combination with a tractor including a body, a rear axle, and a power take-off shaft, hollow housings arranged in pairs on each side of the tractor, the housings of each pair being spaced apart to define a space for the passage therethrough of cotton plants, each of said housings including a bottom wall, rear wall, side walls, and a front wall, portions of said housings at the front and inner sides thereof being cut out, guide members extending from the lower front portion of said housing, a first and second spaced parallel shaft rotatably mounted in each housing, a first set of spaced parallel discs mounted on said first shaft and provided with a plurality of gripping teeth thereon, a second set of spaced parallel discs mounted on said first shaft and being of smaller size than said first disc, spacer members interposed between said discs, said second set of discs having gripping teeth thereon, a plurality of radially extending blades secured to said second shaft for coacting with and removing cotton from said discs, a partition arranged in the top of said housing and defining a casing for holding a quantity of oil, a gear member mounted on the upper end of said first shaft and including a first gear wheel and an integral second gear wheel, a drive shaft extending into said casing and having worm gears thereon meshing with said second gear, chain and sprocket means connecting said drive shaft to said rear axle, a pinion gear mounted on the upper end of said second shaft and meshing with said first gear wheel, a suction creating fan mounted at the rear of the tractor, conduits connecting said fan to the lower ends of said housings, belt and pulley means connecting said fan to said tractor power take-off, a conduit extending upwardly from said fan, bearing members connected to said tractor, rods pivotally mounted in said bearing members, a tiltable hopper connected to the upper ends of said rods, and a manually operable crank for swinging said hopper.

3. The structure as defined in claim 2 wherein said hopper includes reticulated walls and a spring pressed door.

4. A cotton picker comprising hollow housings arranged in pairs in spaced apart relation with respect to each other, each housing including a horizontally disposed bottom wall, a rear wall and a side wall which terminates in a front wall portion, a first and second vertically disposed shaft rotatably mounted in each of said housings, said housings being spaced apart slightly to permit passage therebetween of growing cotton plants, each housing being provided with opposed cut outs, a first set of spaced parallel horizontally disposed superimposed discs positioned in said housings and mounted on said first shaft, portions of said first discs projecting through said cut outs, a second set of spaced parallel horizontally disposed discs mounted on said first shaft, spacer members interposed between said discs, said discs being provided with a plurality of teeth thereon for gripping the cotton so that the cotton will be removed from the plants, gear means interconnecting said first and second shafts together, power means operatively connected to said shafts for driving said shafts, a support member mounted on each of said second shafts, a plurality of radially extending blades mounted on the support members of said second shaft, said second discs being smaller than said first discs so that the cotton picker will gather in all of the cotton and harvest it regardless of the position or size of the cotton, said blades being spaced apart slightly so that the larger discs have sufficient clearance therebetween, said blades serving to cooperate with and remove the cotton from the discs, said blades rotating faster than the discs so that the cotton will be readily stripped or removed from the discs, and guide members extending forwardly from said housings and adapted to engage the cotton plant so as to help straighten these plants and guide them into the space between the housings.

5. A cotton picker comprising hollow housings arranged in pairs in spaced apart relation with respect to each other, each housing including a horizontally disposed bottom wall, a rear wall and a side wall which terminates in a front wall portion, a first and second vertically disposed shaft rotatably mounted in each of said housings, said housings being spaced apart slightly to permit passage therebetween of growing cotton plants, each housing being provided with opposed cut outs, a first set of spaced parallel horizontally disposed superimposed discs positioned in said housings and mounted on said first shaft, portions of said first discs projecting through said cut outs, a second set of spaced parallel horizontally disposed discs mounted on said first shaft, spacer members interposed between said discs, said discs being provided with a plurality of teeth thereon for gripping the cotton so that the cotton will be removed from the plants, gear means interconnecting said first and second shafts together, power means operatively connected to said shafts for driving said shafts, a support member mounted on each of said second shafts, a plurality of radially extending blades mounted on the support members of said second shafts, said second discs being smaller than said first discs so that the cotton picker will gather in all of the cotton and harvest it regardless of the position or size of the cotton, said blades being spaced apart slightly so that the larger discs have sufficient clearance therebetween, said blades serving to cooperate with and remove the cotton from the discs, said blades rotating faster than the discs so that the cotton will be readily stripped or removed from the discs, and guide members extending forwardly from said housings and adapted to engage the cotton plant so as to help straighten these plants and guide them into the space between the housings, a suction fan spaced from said housings, conduit means connecting said fan to said housings, a hopper spaced from said fan, conduit means connecting said hopper to said fan, a spring pressed door on said hopper, said hopper embodying reticulated walls, and a manually operable crank for tilting the hopper.

References Cited in the file of this patent

UNITED STATES PATENTS

| | | |
|---|---|---|
| 423,540 | Todd | Mar. 18, 1890 |
| 439,794 | Todd | Nov. 4, 1890 |
| 2,208,570 | Box | July 23, 1940 |
| 2,473,315 | Wallace | June 14, 1949 |
| 2,484,524 | Nisbet | Oct. 11, 1949 |
| 2,513,259 | Walker | June 27, 1950 |
| 2,696,070 | Mitchell | Dec. 7, 1954 |